Patented Feb. 2, 1937

2,069,215

UNITED STATES PATENT OFFICE 2,069,215

PRINTING PROCESS AND COMPOSITION THEREFOR

Ivan Fleming Chambers, Wilmington, Del., assignor to E. I. du Pont de Nemours & Company, Wilmington, Del., a corporation of Delaware No Drawing. Application August 18, 1934, Serial No. 740,455

14 Claims. (Cl. 8—6)

This invention is concerned with the printing of textile fibers by the aid of vat dyestuffs and with the preparation of printing compositions. More particularly it relates to the preparation and application to a fabric composed of either natural or synthetic fibers of a printing composition containing a vat dyestuff and a material adapted to facilitate the printing operation. The invention also relates to the vat color paste and to the fabric imprinted therewith as articles of manufacture.

By the term "vat dyestuff" hereinafter I am referring to dyestuffs of the anthraquinone, indigo, thioindigo and sulfur series which are capable of being reduced by the aid of alkaline hydrosulfite.

The fixation of vat colors on textile fabrics by reduction and subsequent oxidation is one of the most important dyeing procedures in the textile field. In calico printing, the reduction is effected partially or wholly when the printed material is subjected to the action of steam. During the steaming or ageing operation the dyestuff is mechanically held on the cloth by a vehicle consisting of a starch, dextrin or other paste.

Printing compositions may contain the vat dyestuff in its oxidized form or its reduced, that is, the leuco form. A suitable printing composition may be prepared by mixing the dyestuff paste with a thickening containing an alkaline reacting substance and a reducing agent. As examples of alkaline reacting substances may be mentioned potassium carbonate, sodium carbonate and sodium hydroxide. The reducing agents referred to may be an alkali metal aldehyde sulfoxylate, alkali metal hydrosulfite or glucose. The usual thickening agents are British gum (dextrin), starch and/or gum tragacanth. A small percentage of glycerine is usually added to the printing composition as an assistant.

In the pigment method of printing the vat color is applied to the fabric in its oxidized or pigment form. In the pre-reduction method the color is partially or wholly reduced in the printing composition. A pre-reduction printing composition may be prepared by mixing a previously reduced color with the alkaline thickening, or the printing composition may be heated until partial or total reduction of the color takes place after which it is cooled and applied in the usual manner. After application of the printing composition, the material is steamed or aged in the absence of air. Development of the color is obtained by oxidation usually by treating in a bath containing sodium bichromate and acetic acid. The material is then washed and soaped in order to remove unfixed color, gums, etc., and to brighten the shade. The process as usually practiced suffers from the following defects:

(a) *Poor penetration of color into the fiber*

A comparison between the face and reverse side of the fabric shows that very little color has penetrated to the reverse side. This is particularly noticeable in the printing of regenerated cellulose fibers, in which case only a trace of color is noticeable on the reverse side.

(b) *Poor color yield*

In general the color yield or the percentage of color fixed on the fiber is poor as a considerable amount of unfixed pigment is removed during the soaping operation. This is due in part to a lack of intimate contact between the color particles and fabric resulting from poor dispersion of the dye paste and lack of penetration of the printing composition.

(c) *Lack of brilliancy of prints*

Prints on natural and regenerated cellulose fabrics often lack brilliancy due in part to insufficient reduction and incomplete fixation of the color. If a generally uniform contact between color particle and fabric is not obtained, uneven fixation is obtained as minute areas of fabric become dyed a heavier shade than neighboring areas which results in dull and lusterless prints.

(d) *Specky or mottled prints*

Prints are often specky or mottled in appearance due to poor dispersion of the vat color in the printing composition. The specks or small agglomerates of color particles may result from a poorly dispersed dye paste or from coagulation when the dyestuff paste is mixed with the alkaline thickening. The prints resulting from a coagulated printing paste are specky or mottled in appearance since an uneven dyeing is produced.

(e) *Production of inferior results if the ageing time is curtailed or the percentage of reducing agent in the printing composition is appreciably reduced.*

A constant complaint in the trade is the difficulty in obtaining reduction and fixation of the vat color if the ageing time (usually of 4–5 minutes' duration) is reduced to any appreciable extent or if the percentage of reducing agent in the printing composition varies appreciably from normal practice. At present it is necessary to carefully control these factors if consistent results are to be obtained even though extraordinary care is exercised in the preparation of the printing composition.

It is an object of this invention to provide novel assistants for printing which overcome to a substantial degree most of the above difficulties and give prints of exceptional strength, brilliancy and penetration. It is a further object of this invention to improve the printing process in general, whereby the reduction of the dyestuff and its fixation on the fiber is accomplished more quickly and more efficiently than in standard practice heretofore. A still further object of my invention is to provide novel dyestuff pastes or compositions adapted to be handled as articles of commerce, and prepared for ready use by the printer. Other and further important objects of this invention will appear as the description proceeds.

These objects are accomplished by the addition to the color paste or printing composition of an alkali-soluble salt or salts of the lower aliphatic carboxylic acids. The carboxylic acids especially suitable for the purpose of this invention are branched-chain aliphatic acids containing at least six and not more than twelve carbon atoms. The resultant compositions possess highly desirable wetting, penetrating, and dispersing properties and are particularly valuable in the printing or dyeing of textile materials.

The requisite aliphatic carboxylic acids may be prepared in any suitable manner. Particularly advantageous and especially economical are the branched-chain fatty acids obtainable by the caustic dehydrogenation of the various alcoholic fractions obtainable as by-products in the synthetic manufacture of methanol (hydrogenation or oxidation of carbon oxides). The dehydrogenation or oxidation is generally effected by heating these fractions with caustic soda or potash at a temperature above 300° C. and a pressure above 100 atmospheres, as described more fully in U. S. Patent 1,856,263 to E. E. Reid and in copending application of Hans C. Duus, Serial No. 735,297. The approximate composition of some of these fractions and the sodium salts of fatty acids obtained therefrom are set forth in the following table. For simplicity, the fatty acid sodium salts which I employ are hereinafter designated as Assistant A, Assistant B, Assistant C, and Assistant D.

In the process of dehydrogenation, the only alcohols converted to salts of carboxylic acids are the primary alcohols, the secondary alcohols or derivatives thereof being separated as by-products from the main reaction products. Assistants A, B, C and D therefore consist substantially of the salts as listed in the last column of Table I.

Although particular mention is made of the sodium salts of the lower branched-chain fatty acids in Table I, the potassium salts produce equally satisfactory results. Water-soluble salts obtainable by neutralizing the acids above mentioned with certain organic bases are also of particular value. Examples of organic basic materials which are suitable for the preparation of salts analogous to those mentioned in Table I are given in the following table:

*Table II*

Monoethanolamine
Diethanolamine
Triethanolamine
Monopropanolamine
Dipropanolamine
Tripropanolamine
Monobutanolamine
Dibutanolamine
Tributanolamine
Cyclohexylamine
Cyclohexylmonoethanolamine
Cyclohexyldiethanolamine
Dimethylethanolamine
n-Butylamine
Guanidine
Tetraethylammonium hydroxide
Tetramethylammonium hydroxide
Glucosamine
Diglycerylamine
1,3-diamino-2-propanol
1-aminopropanediol The soluble salts of the lower branched-chain fatty acids as described in Tables I and II may also be employed with a wide variety of additional, known, assistants which in themselves may possess emulsifying, wetting, dispersing, penetrating, or lubricating properties. The additional assistants may be added separately to the color paste or printing composition or may be intimately mixed with an aqueous solution of the salts of the fatty acids, the resultant mixtures being employed as an assistant having special properties. If the additional substances are not

*Table I*

| Assistant | Obtained from alcohols having following boiling range °C. | Components | Boiling points of components °C. | Approximate composition of fraction in % | Chief components of dehydrogenated products |
|---|---|---|---|---|---|
| A | 150–160 | 2-4-dimethyl pentanol-1<br>*Secondary alcohols | 159.5 | 65±<br>35± | Sodium salt of 1-3-dimethyl valeric acid. |
| B | 160–170 | 4-methyl-hexanol<br>2-4-dimethyl hexanol-1<br>*Secondary alcohols | 165.0<br>171.0 | 40±<br>25±<br>35± | Sodium salts of 3-methyl-caproic acid; 1-3-dimethyl caproic acid. |
| C | 160–190 | 4-methyl-hexanol-1<br>2-4-dimethyl hexanol-1<br>†4-methyl heptanol-1 | 165.0<br>171.0<br>161.5 | 40±<br>15±<br>5± | Sodium salts of 3-methyl-caproic acid.<br>1-3-dimethyl-caproic acid; 3-methyl heptylic acid. |
| D | 140–150 | 2-methyl pentanol-1<br>4-methyl pentanol-1<br>*Secondary alcohols | 147.0<br>146.5 | 65±<br>35± | Sodium salts of 1-methyl valeric acid; 3-methyl valeric acid. |

* Including small amounts of primary alcohols.
† Identification not conclusive.

water-soluble they may be readily emulsified, if so desired, in the aqueous solution of the fatty acid salt since these substances are excellent emulsifying agents. As examples of such additional substances may be mentioned the following:

*Table III*

(1) Salts obtained by neutralizing straight chain fatty acids with alkali-metal hydroxides or organic bases mentioned in Table II.

Soluble salts derived from the following fatty acids are suitable:
(a) Formic acid
(b) Propionic acid
(c) Butyric acid
(d) Valeric acid
(e) Caproic acid
(f) Caprylic acid
(g) Capric acid
(h) Lauric acid
(i) Myristic acid
(j) Oleic acid
(k) Stearic acid
(l) Palmitic acid
(m) Ricinoleic acid
(n) Sulforicinoleic acid (2) Polyhydric alcohols and ester or ether derivatives of the same.
Examples:
Ethylene glycol
Glycerine
Diethylene glycol
Triethylene glycol
Ethylene glycol monomethyl ether
Ethylene glycol monoethyl ether
Diethylene glycol monomethyl ether
Diethylene glycol monobutyl ether
Ethylene glycol monoethyl ether acetate
Ethylene glycol monobutyl ether
Glucose
Sucrose (3) Alkylamines, hydroxy-alkylamines, hydroxyalkyl-cycloalkyl amines.
Examples: As described in Table II.

(4) Esters.
Dibutyl phthalate
Lauric acid-methyl ester (5) Phenolic ethers.
Phenyl methyl ether (anisole)
Phenyl ethyl ether (phenetole)
Resorcinol monomethyl ether (6) Mineral oils and sulfonated mineral oils.

(7) Aliphatic sulfonates.
1,2-dihydroxy-propane-3-sodium sulfonate
2-hydroxy-propane-1,3-disodium-sulfonate (8) Aromatic sulfonates.
Salts of the following aromatic sulfonic acids and the alkali-metal hydroxides or the organic bases described in Table II.
Benzene sulfonic acid
p-Toluene sulfonic acid
Tetralin sulfonic acid (9) Hydrogenated benzene, naphthalene, and derivatives.
Tetrahydronaphthalene (tetralin)
Decahydronaphthalene (decalin)
Hexahydrobenzene (cyclohexane)
Cyclohexanol (hexalin)
Cyclohexanone
Hexalin acetate

(10) Synthetic alcohols—
As described in Table I.
(11) Terpenes.
Commercial pine oil
(12) Soluble salts of aryl or aryl-alkyl carboxylic acids.
Examples—
Salts of the following aromatic carboxylic acids and the alkali-metal hydroxides or the organic bases described in Table II.

Benzoic acid
Phthalic acid
Phenyl acetic acid
Phenylamino acetic acid (phenyl glycine)
Picolinic acid (pyridine alpha carboxylic acid)
Pipecolinic acid (piperidine alpha carboxylic acid)

(13) Alkylated naphthalene sulfonates.
Isopropyl naphthalene sodium sulfonate
Formaldehyde - naphthalene - sulfonic acid condensation product

(14) Alkali-soluble anthraquinone compounds, especially the mono- and disulfonic acids, the di- and trihydroxy compounds, or the various hydroxy-anthraquinone-sulfonic acids. The most common representative of this group of assistants is "silver salt" (the sodium salt of anthraquinone-$\beta$-sulfonic acid).

The following examples illustrate the invention although it will be understood that the invention is not restricted to these examples:

*Example I*

A printing composition was prepared as follows:
20 parts of Sulfanthrene Blue 2BD Double Paste (Colour Index #1184) were mixed with
70 parts of Thickener A as described below; to this was added
10 parts of a 35% aqueous solution of Assistant A as above defined.

100 parts. The whole was thoroughly mixed to form a smooth paste.

Thickener A was prepared as follows:—
100 parts of wheat starch, and
300 parts of British gum were pasted with
600 parts of water 1,000 parts. This mixture was heated at the boil for 10 minutes and cooled to room temperature. A smooth paste was obtained, which will hereinafter be referred to as Thickening SBG.
560 parts of the above thickening (SBG) were heated to 170° F. There was then added
170 parts of potassium carbonate. After the potassium carbonate had dissolved, the paste was cooled to 140° F. and the following ingredients added—
120 parts of sodium sulfoxylate formaldehyde
50 parts of glycerine
100 parts of water 1,000 parts. The whole was stirred to form a smooth paste, which will hereinafter be referred to as Thickener A.

Regenerated cellulose piece-goods were printed with the printing composition prepared as described above, dried, and aged for 5 minutes at 214° F. in a rapid ager of the Mather-Platt type.

The printed material was then treated for 1 minute in an oxidizing bath at 140° F. containing ½% of sodium bichromate and ½% of acetic acid, rinsed in cold water, soaped for 5 minutes in a soap bath at 160° F. containing ½% of soap, rinsed, and dried. A brilliant level blue print was obtained according to the pattern of the printing roll showing very good penetration to the reverse side of the fabric.

*Example II*

15 parts of Sulfanthrene Orange R paste (C. I. #1217) wrere mixed with
70 parts of Thickener A as prepared in Example I. To this was added
12 parts of a 35% aqueous solution of Assistant B as above defined
3 parts of sodium hydrosulfite
___
100 parts—The whole was stirred to form a smooth paste, heated to 150° F. in order to partially reduce the color and cooled to room temperature.

Piece-goods containing cotton and viscose rayon fibers were printed with the above printing composition. The material was aged, oxidized, and soaped according to the procedure described in Example I. A brilliant orange dyeing was obtained which showed exceptional penetration of color to the reverse side of the fabric.

*Example III*

A printing composition was prepared as follows:

15 parts of Sulfanthrene Pink FF paste (C. I. #1211) were mixed with
47 parts Thickening SBG (see Example I). To this was added
7 parts of potash
5 parts of caustic soda—35% solution
5 parts of glycerine and
10 parts of a 50% solution of Assistant D as above defined
5 parts of sodium hydrosulfite. The whole was heated to 180° F., cooled to 140° F. and
6 parts of sodium sulfoxylate formaldehyde added.
___
100 parts. The whole was then stirred until a smooth paste was obtained.

Piece-goods containing cotton cuprammonium rayon, and cellulose acetate fibers were printed with the above printing composition, dried, aged, oxidized, soaped and finished according to the procedure as described in Example I.

A brilliant red dyeing was obtained which showed good penetration to the reverse side of the fabric.

*Example IV*

10 parts of Sulfanthrene Brown G Paste (or Ciba Brown G Paste) were mixed with
42 parts Thickening SBG. To this was added
5 parts of glycerine
8 parts of caustic soda—35% solution
10 parts of potash
15 parts of a 35% aqueous solution of Assistant C as above described
10 parts of glucose
___
100 parts.

Cotton and regenerated cellulose piece-goods were printed with the above printing composition, dried, aged, oxidized, soaped, and finished according to the procedure described in Example I. A brilliant brown speck-free dyeing was obtained.

*Example V*

6 parts of Sulfogene Fast Black CL (Indocarbon CL) were slowly mixed with
42 parts of Thickening SBG
5 parts of glycerine
4 parts of potassium carbonate
20 parts of sodium hydroxide—35% solution
8 parts of glucose
15 parts of an aqueous solution of Assistant D
___
100 parts.

Cotton and viscose rayon piece-goods were printed with the above printing composition, dried, aged, oxidized, and finished according to the procedure described in Example I. A brilliant black dyeing was obtained.

*Example VI*

20 parts of Ponsol Jade Green Paste (C. I. #1101) were mixed with
65 parts of Thickener B as described below. There was then added
15 parts of 50% solution of Assistant D
___
100 parts.

Thickener B was prepared as follows:

530 parts of Thickening SBG as described in Example I were heated to 120° F. There was then added
200 parts of potassium carbonate. Upon solution of the potassium carbonate the paste was cooled to 140° F. and the following ingredients added
170 parts of sodium sulfoxylate formaldehyde
50 parts of glycerine and
50 parts of water
___
1,000 parts. The whole was stirred to form a smooth paste.

Cotton and viscose rayon piece-goods were printed, aged, oxidized and finished according to the procedure described in Example I. A level green dyeing was obtained showing exceptional penetration into the fiber.

*Example VII*

20 parts of Ponsol Dark Blue BR Paste (C. I. #1099) were mixed with
70 parts of Thickener B as described in Example VI. To this was added
10 parts of 50% solution of Assistant C as described above
___
100 parts.

Piece-goods containing viscose rayon and cellulose acetate fibers were printed with the above printing composition, dried, aged, oxidized, and soaped by the process described in Example I. A level, brilliant blue dyeing was obtained.

*Example VIII*

15 parts of Sulfanthrene Yellow R Paste (C. I. #1170) were mixed with
67 parts of Thickener A (as in Example I). To this was added
10 parts of a 50% solution of Assistant C and
8 parts of a 25% solution of sodium caprylate
___
100 parts.

Cotton and rayon piece-goods were printed with the above printing composition, aged, oxidized, and finished as in Example I. A brilliant yellow dyeing of excellent penetration was obtained on both fibers.

Example IX 15 parts of Sulfanthrene Violet B Double Paste (C. I. #1222) were mixed with
69 parts of Thickener A (as in Example I). To this was added
12 parts of a 50% solution of Assistant D
4 parts of a 25% solution of sodium oleate
—
100 parts.

Cotton and viscose rayon piece-goods were printed, dried, aged, oxidized, soaped, and finished according to the procedure described in Example I. A brilliant and level violet dyeing was obtained.

Example X 15 parts of Ponsol Dark Blue BR Paste, (C. I. #1099) were mixed with
73 parts of Thickener B (as in Example VI). To this was added
12 parts of the triethanolamine salt of 1–3 dimethyl valeric acid
—
100 parts.

Piece-goods containing cotton, viscose rayon, and cellulose acetate fibers were printed with the above printing composition, dried, aged, oxidized, and soaped as in Example I. A brilliant, level dyeing fast to light and laundering agencies was obtained.

Example XI 15 parts of Ponsol Blue BCS Paste (C. I. #1114) were mixed with
67 parts of Thickener B (as in Example VI). To this was added
10 parts of triethanolamine and
8 parts of a 50% solution of Assistant D
—
100 parts.

Cotton and cuprammonium rayon piece-goods were printed and the color developed according to the procedure described in Example I. A brilliant, level blue dyeing was obtained of excellent general fastness properties.

Example XII 15 parts of Du Pont Vat Yellow 8G Double Paste were mixed with
71 parts of Thickener B (as in Example VI). To this was added
10 parts of a 50% solution of Assistant D and
4 parts of mineral oil
—
100 parts.

Cotton and rayon piece-goods were printed and the color developed according to the procedure described in Example I. A brilliant yellow dyeing showing excellent penetration was obtained.

Example XIII 15 parts of Indanthrene Yellow GGK Paste were mixed with
73 parts of Thickener B (as described in Example VI). To this was added
8 parts of a 50% solution of Assistant D and
4 parts of a 25% solution of sodium stearate
—
100 parts.

Cotton and viscose rayon piece-goods were printed and the color developed as in Example I. A brilliant level yellow dyeing was obtained showing excellent penetration.

Example XIV 10 parts of Ponsol Blue GD Double Paste (C. I. #1113) were mixed with
79 parts of Thickener B (as described in Example VI). To this was added
8 parts of 50% solution Assistant A and
3 parts of benzene sodium sulfonate
—
100 parts.

Cotton, rayon, and cellulose acetate piece-goods were printed and developed as in Example I. A brilliant blue dyeing of excellent penetration was obtained.

Example XV 15 parts of Ponsol Brilliant Violet 4RN Paste were mixed with
67 parts of Thickener B (as in Example VI). To this was added
10 parts of a 50% solution of Assistant C and
8 parts of diethylene glycol
—
100 parts.

Cotton, rayon and cellulose acetate piece-goods were printed and developed as in Example I. A speck-free brilliant violet dyeing was obtained.

Example XVI 10 parts of Ponsol Jade Green Paste (C. I. #1101) were mixed with
80 parts of Thickener B (as in Example VI). To this was added
6 parts of a 50% solution of Assistant A and
4 parts of phenyl ethyl ether
—
100 parts.

Cotton and rayon piece-goods were printed with the above printing composition and developed as in Example I. A brilliant green dyeing was obtained showing excellent penetration.

Example XVII 15 parts of Ponsol Yellow G Double Paste (C. I. #1118) were mixed with
75 parts of Thickener B (as in Example VI). To this was added
4 parts of a 50% solution of Assistant B
3 parts of dibutyl phthalate and
3 parts of 2-hydroxy-propane-1,3-disodium-sulfonate
—
100 parts.

Cotton and rayon piece-goods were printed with the above printing composition and the color developed as in Example I. A brilliant yellow dyeing was obtained.

Example XVIII 15 parts of Ponsol Blue GD Double Paste (C. I. #1113) were mixed with
69 parts of Thickener B (as in Example VI). To this was added
12 parts of a 50% solution of Assistant D and
4 parts of tetraline
—
100 parts.

Cotton and rayon piece-goods were printed with the above printing composition and the color developed as in Example I. A brilliant blue dyeing was obtained showing excellent penetration.

Example XIX 15 parts of Ponsol Golden Orange G Double Paste (C. I. #1096) were mixed with
72 parts of Thickener B (as in Example VI). To this was added
8 parts of a 50% solution of Assistant D
5 parts of pine oil 100 parts.

Cotton and rayon piece-goods were printed with the above printing composition and the color developed according to the procedure described in Example I. An orange dyeing of exceptional penetration was obtained.

Example XX 15 parts of Sulfanthrene Orange R Paste (C. I. #1217) were mixed with
40 parts of Thickener A and
35 parts of Thickening SBG (as in Example I). To this was added
6 parts of 50% solution of Assistant B and
4 parts of sodium picolinate 100 parts.

Cotton and rayon piece-goods were printed with the above printing composition and the color developed according to the procedure described in Example I. A brilliant and fully developed dyeing was obtained although the percentage of alkali and sodium sulfoxylate formaldehyde in the printing composition was appreciably reduced.

Example XXI

An assistant dyestuff paste was prepared as follows:

100 parts of Sulfanthrene Orange R Paste (C. I. #1217) (aqueous suspension) were mixed with
65 parts of a 35% solution of Assistant B as above described, 165 parts total. From this mixture there was evaporated
65 parts of water—producing 100 parts of Assistant Sulfanthrene Orange R Paste This paste may be handled as an article of commerce, and is adapted for direct use by the printer in the regular printing procedure.

Example XXII

An assistant dyestuff paste was prepared as follows:

100 parts of Sulfanthrene Pink FF Paste (C. I. #1211) were mixed with
60 parts of a 35% solution of Assistant A and
5 parts of sodium stearate 165 parts total. There was then evaporated
65 parts of water producing 100 parts Assistant Sulfanthrene Pink FF Paste.

Example XXIII 100 parts of Sulfanthrene Blue 2BD Double Paste (C. I. #1184) were mixed with
40 parts of a 35% solution of Assistant C and
20 parts of glycerine 160 parts total. There was then evaporated
60 parts of water producing 100 parts Assistant Sulfanthrene Blue 2BD Double Paste. This was milled in a color mill which produced a smooth homogeneous paste.

Example XXIV 100 parts of Ponsol Jade Green Paste (C. I. #1101) were mixed with
70 parts of a 35% solution of Assistant D 170 parts total. There was then evaporated
70 parts of water producing 100 parts of Assistant Ponsol Jade Green Paste.

Example XXV

An assistant dyestuff paste was prepared as follows:
10 parts of pine oil were intimately mixed with
75.5 parts of a 40% solution of Assistant C forming a stable emulsion. There was then added
14 parts of Ponsol Dark Blue BR (C. I. #1099) dry press cake and
0.5 parts of β-naphthalene-sulfonic-acid-formaldehyde - condensation product (Na-salt)

100.0 parts (total)

The above mixture was then milled in a rod mill for two hours. A stable assistant dyestuff paste was obtained.

Example XXVI

An assistant dyestuff paste was prepared as follows:
7 parts of ethylene glycol monobutyl ether were intimately mixed with
80 parts of a 35% solution of Assistant D forming a stable emulsion. There was then added
12 parts of Sulfanthrene Yellow R (C. I. #1170) dry press cake and
1 part of β-naphthalene-sulfonic-acid-formaldehyde-condensation product (Na-salt).

100 parts (total)

The above mixture was then milled in a rod mill for three hours. A finely dispersed assistant dyestuff paste was obtained.

Example XXVII 15 parts of Ponsol Blue GD (C. I. #1113) dry press cake were mixed with
20 parts of diethylene glycol
64 parts of a 35% solution of Assistant B and
1 part of β-naphthalene-sulfonic-acid-formaldehyde-condensation product (Na-salt).

100 parts (total)

The above mixture was milled for four hours in a rod mill. A finely dispersed assistant paste was obtained.

Example XXVIII

| | |
|---|---|
| 100 | parts of Ponsol Yellow G Double Paste (C. I. #1118) were mixed with |
| 40 | parts of a 40% solution of Assistant B |
| 140 | parts (total). There was then evaporated |
| 40 | parts of water producing |
| 100 | parts of Assistant Ponsol Yellow G Double Paste. |

Example XXIX

| | |
|---|---|
| 100 | parts of Ponsol Blue BCS Double Paste (C. I. #1114) were mixed with |
| 40 | parts of the triethanolamine salt of 1-3-dimethyl valeric acid |
| 140 | parts (total). There was then evaporated |
| 40 | parts of water producing |
| 100 | parts of Assistant Ponsol Blue BCS Double Paste. |

The above assistant dyestuff paste was milled in a color mill in order to obtain a more homogeneous preparation.

Example XXX

| | |
|---|---|
| 100 | parts of Sulfanthrene Red 3B Paste (C. I. #1212) were mixed with |
| 40 | parts of a 35% solution of Assistant C and |
| 10 | parts of p-toluene sodium sulfonate |
| 150 | parts (total). There was then evaporated |
| 50 | parts of water producing |
| 100 | parts of Assistant Sulfanthrene Red 3B Paste. |

The above assistant dyestuff paste was milled in a color mill.

Example XXXI

| | |
|---|---|
| 100 | parts of Ponsol Flavone GC Paste (C. I. #1095) were mixed with |
| 40 | parts of a 35% solution of Assistant D and |
| 10 | parts of the sodium salt of phenyl acetic acid |
| 150 | parts (total). There was then evaporated |
| 50 | parts of water producing |
| 100 | parts of Assistant Ponsol Flavone GC Paste. |

The above assistant paste was milled in a color mill.

Example XXXII

| | |
|---|---|
| 50 | parts of a dyestuff press cake consisting of 14 parts of Sulfanthrene Orange R (C. I. #1217) and 36 parts of water were mixed with |
| 70 | parts of a 35% solution of Assistant C |
| 1 | part of a 30% solution of β-naphthalene-sulfonic - acid - formaldehyde condensation product (Na-salt) and |
| 4 | parts of a 25% suspension of anthraquinone-2-sodium sulfonate |
| 125 | parts. This mixture was agitated for 1 hour in a paddle type mixer until a homogeneous paste was obtained. There was then evaporated |
| 25 | parts of water producing |
| 100 | parts of Sulfanthrene Orange R Paste which was further homogenized by milling through a colloid mill. |

The products of Examples XXI to XXXII are adapted for handling as an article of commerce, for direct use by the printer, and lead to superior results without requiring any special skill or manipulation on the part of the printer.

It will be clear now that my invention is susceptible of wide variations without departing from the spirit of this disclosure.

By the use of my novel assistants as above described, superior results may be obtained in printing with vat dyestuffs. Moreover, new compositions of matter may be prepared and handled as an article of commerce ready for direct use by the printer and leading to superior results.

The advantages obtained by my novel assistants in printing have already been indicated in the above examples. To summarize, the color pastes acquire improved wetting, penetrating and dispersing properties; the prints are very uniform and free from speckiness; the utilization of the dyestuff is more complete than by other known methods; the reduction of the dyestuff is easier, and therefore fixation of the color on the fiber may be effected in shorter ageing time or with less reducing agent than in standard practice heretofore; the prints possess exceptional strength, brilliancy and penetration on either natural or synthetic fibers. These advantages are noticeable not only on material especially prepared for printing, but also on grey goods or goods which have not been boiled out, kier boiled, or bleached previous to the printing operation. The advantages above cited are applicable to prints on cotton, wool, silk, viscose, nitrocellulose, or cupra ammonium rayon, and cellulose acetate or other cellulose ester or ether fibers.

In the claims below the term "vat dyestuffs" is used as a generic term to cover vat dyestuffs of the anthraquinone, indigo, thioindigo, and sulfur series, which are capable of reduction by the aid of alkaline hydrosulfite.

Also, the term "lower-aliphatic" is used to designate aliphatic compounds having less than 12 carbon atoms.

I claim:

1. In a process of printing textile fibers with vat dyestuffs, the improvement which comprises applying the dyestuff to the fiber in the presence of an alkali-soluble salt of a branched-chain aliphatic carboxylic acid containing not less than 6 and not more than 12 carbon atoms.

2. In a process of printing textile fibers with vat dyestuffs, the improvement which comprises applying the dyestuff to the fiber in the presence of an alkali-soluble salt of a carboxylic acid of the group obtainable by alkaline dehydrogenation of the branched-chain alcohols obtainable as by-products in the synthetic manufacture of methanol and having a boiling point within the range of 140 to 190° C.

3. In a process of printing textile fibers with vat dyestuffs, the improvement which comprises applying the dyestuff to the fiber in the presence of an alkali-metal salt of a lower, branched-chain aliphatic carboxylic acid as defined in claim 2.

4. In a process of printing textile fibers with vat dyestuffs, the improvement which comprises applying the dyestuff to the fiber in the presence of the salt of an alkanolamine and a lower, branched-chain aliphatic acid as defined in claim 2.

5. A printing composition comprising a vat dyestuff of the anthraquinone, indigo, thioindigo and sulfur series, a water-soluble salt of a branched-chain aliphatic carboxylic acid containing not less than 6 and not more than 12 carbon atoms, an alkaline reacting substance, a thickening agent and a reducing agent.

6. A printing composition comprising a vat dyestuff of the anthraquinone series, an alkali-metal salt of a branched-chain aliphatic acid containing from 6 to 8 carbon atoms, and the usual alkaline thickening, and reducing agents.

7. A printing composition comprising a vat dyestuff of the anthraquinone series, the salt of an alkanolamine and a branched-chain aliphatic acid containing from 6 to 8 carbon atoms, and the usual alkaline, thickening, and reducing agents.

8. A printing composition as defined in claim 6, and containing further a dispersing agent.

9. A printing composition as defined in claim 6, and containing further an anthraquinone catalyst.

10. A dyestuff composition adapted for use in printing textile fiber, comprising a vat dyestuff, and a water-soluble salt of a carboxylic acid of the group obtainable by alkaline dehydrogenation of the branched-chain alcohols obtainable as by-products in the synthetic manufacture of methanol and having a boiling point within the range of 140 to 190° C.

11. A dyestuff composition adapted for use in printing textile fiber, comprising a vat dyestuff, and the salt of an alkanolamine and a lower, branched-chain aliphatic acid.

12. A dyestuff composition adapted for use in printing textile fiber, comprising a vat dyestuff, a polyhydroxy-alcohol, a dispersing agent, and an alkali-metal salt of a lower, branched-chain aliphatic carboxylic acid of 6 to 12 carbon atoms, of the type obtainable by alkaline dehydrogenation of the alcohols obtainable as by-products in the synthetic manufacture of methanol.

13. In the process of printing artificial silk fabrics with vat dyestuffs, the improvement which comprises applying the dyestuff to the fabric in the presence of an alkali-metal salt of a carboxylic acid of the group obtainable by alkaline dehydrogenation of the branched-chain alcohols obtainable as by-products in the synthetic manufacture of methanol and having a boiling point within the range of 140 to 190° C.

14. A dyestuff composition adapted for use in printing artificial cellulosic fiber, comprising a vat dyestuff in unreduced form, and an alkali-metal salt of a branched-chain aliphatic carboxylic acid of 6 to 12 carbon atoms.

IVAN FLEMING CHAMBERS.

CERTIFICATE OF CORRECTION.

Patent No. 2,069,215. February 2, 1937.

IVAN FLEMING CHAMBERS.

It is hereby certified that error appears in the printed specification of the above numbered patent requiring correction as follows: Page 2, first column, last line, the words "Identificatnot conion clusive" should read Identification not conclusive; and that the said Letters Patent should be read with this correction therein that the same may conform to the record of the case in the Patent Office.

Signed and sealed this 8th day of June, A. D. 1937.

(Seal)

Henry Van Arsdale
Acting Commissioner of Patents.

chain aliphatic carboxylic acid containing not less than 6 and not more than 12 carbon atoms, an alkaline reacting substance, a thickening agent and a reducing agent.

6. A printing composition comprising a vat dyestuff of the anthraquinone series, an alkali-metal salt of a branched-chain aliphatic acid containing from 6 to 8 carbon atoms, and the usual alkaline thickening, and reducing agents.

7. A printing composition comprising a vat dyestuff of the anthraquinone series, the salt of an alkanolamine and a branched-chain aliphatic acid containing from 6 to 8 carbon atoms, and the usual alkaline, thickening, and reducing agents.

8. A printing composition as defined in claim 6, and containing further a dispersing agent.

9. A printing composition as defined in claim 6, and containing further an anthraquinone catalyst.

10. A dyestuff composition adapted for use in printing textile fiber, comprising a vat dyestuff, and a water-soluble salt of a carboxylic acid of the group obtainable by alkaline dehydrogenation of the branched-chain alcohols obtainable as by-products in the synthetic manufacture of methanol and having a boiling point within the range of 140 to 190° C.

11. A dyestuff composition adapted for use in printing textile fiber, comprising a vat dyestuff, and the salt of an alkanolamine and a lower, branched-chain aliphatic acid.

12. A dyestuff composition adapted for use in printing textile fiber, comprising a vat dyestuff, a polyhydroxy-alcohol, a dispersing agent, and an alkali-metal salt of a lower, branched-chain aliphatic carboxylic acid of 6 to 12 carbon atoms, of the type obtainable by alkaline dehydrogenation of the alcohols obtainable as by-products in the synthetic manufacture of methanol.

13. In the process of printing artificial silk fabrics with vat dyestuffs, the improvement which comprises applying the dyestuff to the fabric in the presence of an alkali-metal salt of a carboxylic acid of the group obtainable by alkaline dehydrogenation of the branched-chain alcohols obtainable as by-products in the synthetic manufacture of methanol and having a boiling point within the range of 140 to 190° C.

14. A dyestuff composition adapted for use in printing artificial cellulosic fiber, comprising a vat dyestuff in unreduced form, and an alkali-metal salt of a branched-chain aliphatic carboxylic acid of 6 to 12 carbon atoms.

IVAN FLEMING CHAMBERS.

CERTIFICATE OF CORRECTION.

Patent No. 2,069,215.     February 2, 1937.

IVAN FLEMING CHAMBERS.

It is hereby certified that error appears in the printed specification of the above numbered patent requiring correction as follows: Page 2, first column, last line, the words "Identificatnot conion clusive" should read Identification not conclusive; and that the said Letters Patent should be read with this correction therein that the same may conform to the record of the case in the Patent Office.

Signed and sealed this 8th day of June, A. D. 1937.

(Seal)     Henry Van Arsdale
Acting Commissioner of Patents.

CERTIFICATE OF CORRECTION.

Patent No. 2,069,215. February 2, 1937.

IVAN FLEMING CHAMBERS.

It is hereby certified that error appears in the printed specification of the above numbered patent requiring correction as follows: Page 2, first column, last line, the words "Identificatnot conion clusive" should read Identification not conclusive; and that the said Letters Patent should be read with this correction therein that the same may conform to the record of the case in the Patent Office.

Signed and sealed this 8th day of June, A. D. 1937.

(Seal)

Henry Van Arsdale
Acting Commissioner of Patents.